US008007829B2

(12) United States Patent
Murthy et al.

(10) Patent No.: US 8,007,829 B2
(45) Date of Patent: *Aug. 30, 2011

(54) METHOD TO FABRICATE INHOMOGENEOUS PARTICLES

(75) Inventors: Vinit S. Murthy, Houston, TX (US); Michael S. Wong, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1625 days.

This patent is subject to a terminal disclaimer.

(21) Appl. No.: 11/335,328

(22) Filed: Jan. 19, 2006

(65) Prior Publication Data
US 2006/0159921 A1 Jul. 20, 2006

Related U.S. Application Data

(60) Provisional application No. 60/644,912, filed on Jan. 19, 2005.

(51) Int. Cl.
*A61K 9/14* (2006.01)
(52) U.S. Cl. ............ 424/489; 424/490; 264/4; 427/212; 428/403; 428/404; 428/407
(58) Field of Classification Search ...... 264/4; 427/212; 428/403, 404, 407; 424/489, 490
See application file for complete search history.

(56) References Cited

U.S. PATENT DOCUMENTS

| 6,395,253 B2 * | 5/2002 | Levy et al. ............... 424/1.25 |
| 6,479,146 B1 * | 11/2002 | Caruso et al. ............. 428/403 |
| 2003/0082237 A1 | 5/2003 | Cha et al. |
| 2003/0170313 A1 | 9/2003 | Prokop |
| 2005/0158390 A1 | 7/2005 | Rana et al. |

FOREIGN PATENT DOCUMENTS

| WO | 2006078777 A2 | 7/2006 |
| WO | 2006078777 A3 | 7/2006 |

OTHER PUBLICATIONS

Cha, Jennifer N., et al., "Microcavity lasing from block peptide hierarchically assembled quantum dot spherical resonators," Nano Letters, 2003, pp. 907-911, vol. 3, No. 7, American Chemical Society.
Cha, Jennifer N., et al., "Spontaneous formation of nanoparticle vesicles from homopolymer polyelectrolytes," J. Am. Chem. Soc., 2003, pp. 8285-8289, vol. 125, No. 27, American Chemical Society.
Murthy, Vinit S., et al., "Charge-driven flocculation of poly(L-lysine)—gold nanoparticle assemblies leading to hollow microspheres," J. Am. Chem. Soc., 2004, pp. 5292-5299, vol. 126, No. 16, American Chemical Society.
Steed, Johathan, et al., "Supramolecular chemistry," 2001, 2 pages, John Wiley & Sons.
Wong, Michael S., et al., "Assembly of nanoparticles into hollow spheres using block copolypeptides," Nano Letters, 2002, pp. 583-587, vol. 2, No. 6, American Chemical Society.
Cayre, Olivier, et al., "Fabrication of asymmetrically coated colloid particles by microcontact printing techniques," J. Mater. Chem., 2003, pp. 2445-2450, vol. 13, The Royal Society of Chemistry.
Choi, Jaehyuck, et al., "Patterned fluorescent particles as nanoprobes for the investigation of molecular interactions," Nano Letters, 2003, pp. 995-1000, vol. 3, No. 8, American Chemical Society.
Fujimoto, Keiji, et al., "Preparation of unsymmetrical microspheres at the interfaces," Langmuir, 1999, pp. 4630-4635, vol. 15, No. 13, American Chemical Society.
Glotzer, Sharon C., "Some assembly required," www.sciencemag.org, Oct. 15, 2004, pp. 419-420, vol. 306, Science, published by AAAS.
Hermanson, Greg T., "Bioconjugate techniques," First Edition 1996, 2 pages, Academic Press, Copyright 2008 by Elsevier Inc., USA.
Love, J. Christopher, et al., "Fabrication and wetting properties of metallic half-shells with submicron diameters," Nano Letters, 2002, pp. 891-894, vol. 2, No. 8, American Chemical Society.
Lu, Yu, et al., "Asymmetric dimers can be formed by dewetting half-shells of gold deposited on the surfaces of spherical oxide colloids," J. Am. Chem. Soc., 2003, pp. 12724-12725, vol. 125, No. 42, American Chemical Society.
Nakahama, Kazumichi, et al., "A novel preparation of nonsymmetrical microspheres using the Langmuir—Blodgett technique," Langmuir, 2000, pp. 7882-7886, vol. 16, No. 21, American Chemical Society.
Petit, Laeticia, et al., "Dissymmetric silica nanospheres: a first step to difunctionalized nanomaterials," J. Mater. Chem., 2000, pp. 253-254, vol. 10, The Royal Society of Chemistry.
Petit, Laeticia, et al., "Sub-micrometer silica spheres dissymmetrically decorated with gold nanoclusters," Materials Letters, Dec. 2001, pp. 478-484, vol. 51, Elsevier Science B.V.

(Continued)

*Primary Examiner* — Leszek Kiliman
(74) *Attorney, Agent, or Firm* — Conley Rose, P.C.; Rodney B. Carroll

(57) ABSTRACT

A method for making inhomogeneous microparticles comprises a) providing an amount of each of at least two polyelectrolytes having a charge, b) providing an amount of a counterion having a valence of at least 2, c) combining the polyelectrolytes and the counterion in a solution such that the polyelectrolyte self-assembles to form inhomogeneous aggregates, and d) adding nanoparticles to the solution such that nanoparticles arrange themselves around the inhomogeneous aggregates to form inhomogeneous particles. The polyelectrolyte may have a positive or negative charge. The charge ratio R of total charge of the counterions to the total charge of the polyelectrolyte may be greater than 1.0.

32 Claims, 4 Drawing Sheets

OTHER PUBLICATIONS

Rana, Rohit K., et al., "Nanoparticle self-assembly of hierarchically ordered microcapsule structures," Adv. Mater., 2005, pp. 1145-1150, vol. 17, Wiley-VCH Verlag GmbH & Co. KGaA, Weinheim.

Roh, Kyung-Ho, et al., "Biphasic Janus particles with nanoscale anisotropy," nature materials, Oct. 2005, pp. 759-763, vol. 4, Nature Publishing Group.

Takei, H., et al., "Gradient sensitive microscopic probes prepared by gold evaporation and chemisorption on latex spheres," Langmuir, Apr. 2, 1997, pp. 1865-1868, vol. 13, No. 7, American Chemical Society.

Whitesides, George M., et al., "Self-assembly at all scales," www.sciencemag.org, Mar. 29, 2002, pp. 2418-2421, vol. 295, Science.

Zhang, Zhenli, et al., "Self-assembly of patchy particles into diamond structures through molecular mimicry," Langmuir, Dec. 6, 2005, pp. 11547-11551, vol. 21, No. 25, American Chemical Society.

Hirsch, L. R., et al., "Nanoshell-mediated near-infrared thermal therapy of tumors under magnetic resonance guidance," PNAS, vol. 100, No. 23 (Nov. 11, 2003), The National Academy of Sciences, pp. 13549-13554.

Jackson, Alicia M., et al., "Spontaneous assembly of subnanometre-ordered domains in the ligand shell of monolayer-protected nanoparticles," Nature Materials, vol. 3 (May 2004), Nature Publishing Group, pp. 330-336.

Nelson, David R., "Towards a Tetravalent Chemistry of Colloids" (May 1, 2007), arXiv:cond-mat/0206552v2 Jul. 9, 2002, Lyman Laboratory of Physics, Harvard University, Cambridge, MA, pp. 1-14.

Zhang, Zhenli, et al., "Self-Assembly of Patchy Particles," Nano Letters, vol. 4, No. 8 (2004), American Chemical Society, pp. 1407-1413.

Foreign Communication from a counterpart application, International Search Report and Written Opinion, PCT/US06/01835, Sep. 12, 2007, 9 pgs.

\* cited by examiner

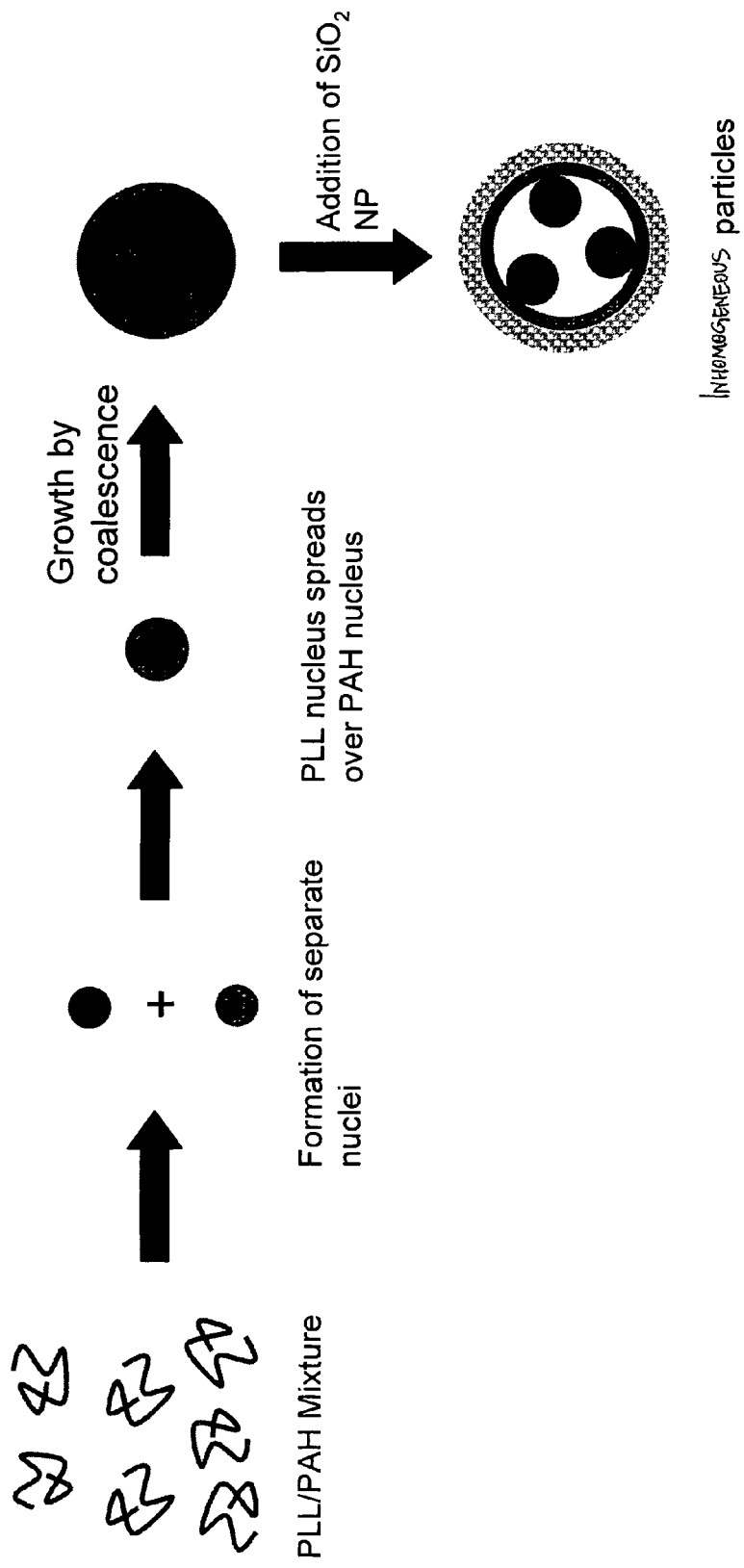
Figure 1. Schematic showing the proposed mechanism.

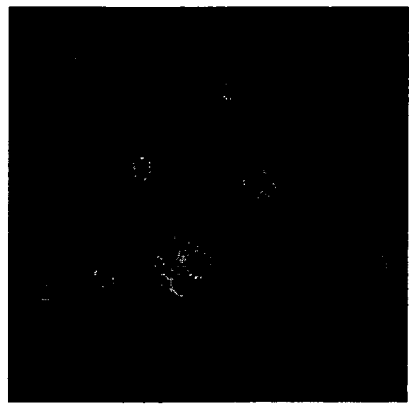
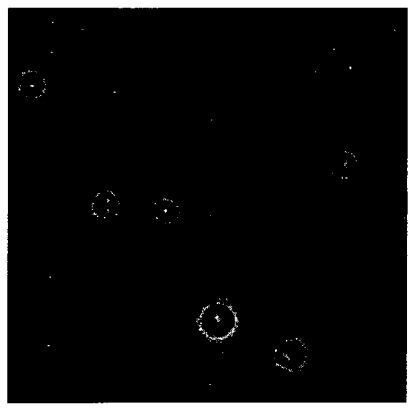
Figure 2. Microphase separated (PLL + PAH) aggregate morphology as a function of relative polymer concentrations.

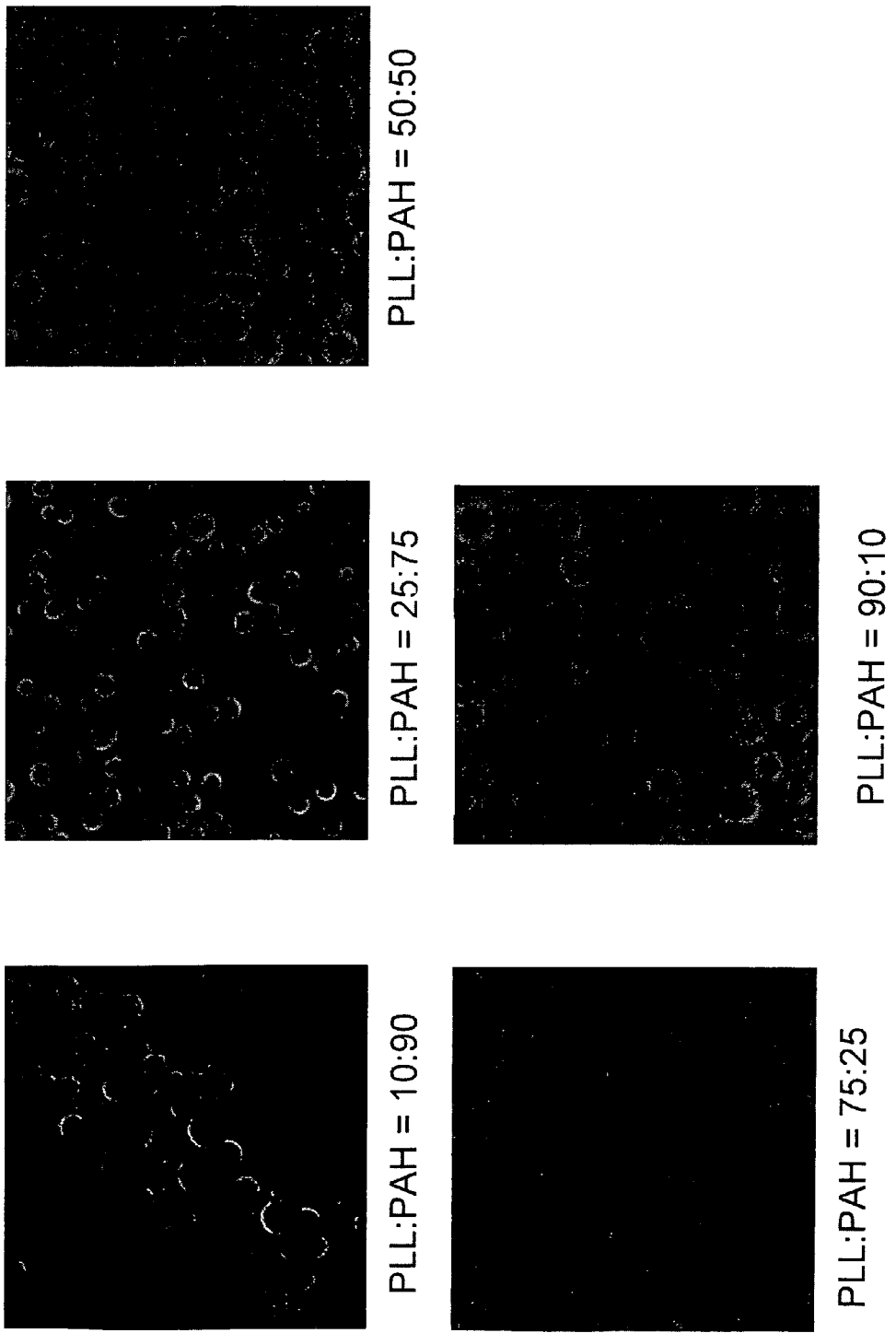
Figure 3. Inhomogeneous microcapsules from microphase separated mixtures of (poly-L-lysine + poly(allylamine)), trisodium citrate, and silica nanoparticles

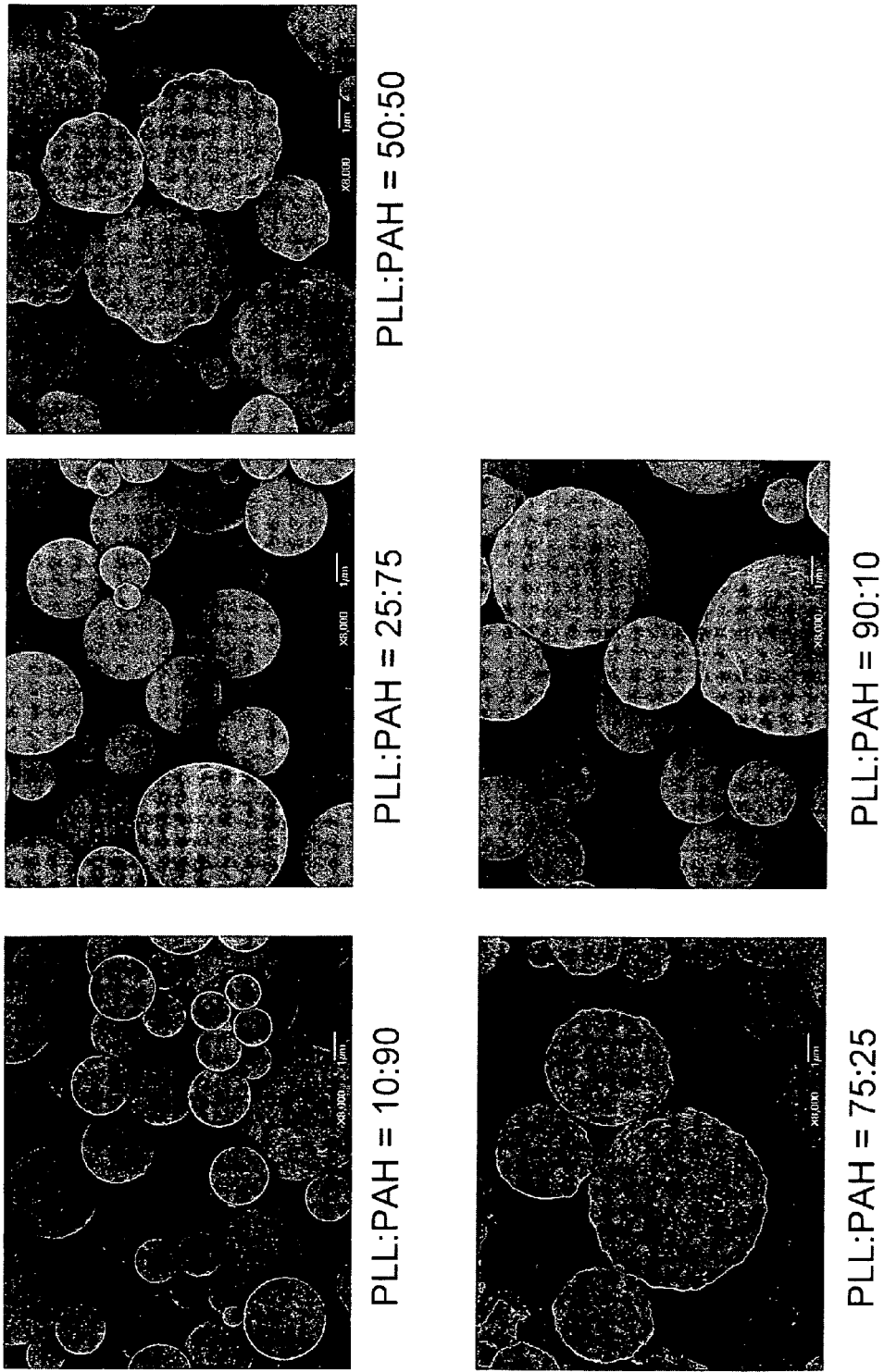
Figure 4. Inhomogeneous particles obtained after addition of a covalent crosslinker (glutaraldehyde) to the (PLL + PAH) aggregates.

METHOD TO FABRICATE INHOMOGENEOUS PARTICLES

STATEMENT REGARDING FEDERALLY SPONSORED RESEARCH OR DEVELOPMENT

Not Applicable

FIELD OF THE INVENTION

This invention relates generally to the field of fabricating particles. More particularly, the present invention relates to a unique method for the fabrication of particles (100 nm-50 microns in diameter) with well defined inhomogeneities or patches on the surface as well as inhomogeneities in the interior of the particles.

BACKGROUND OF THE INVENTION

The next generation materials and components used in molecular circuitry, optical applications, clinical diagnostics, sensors, and drug delivery devices will rely on building blocks self-assembling and forming higher order structures. But despite recent advancements in the synthesis techniques of a large variety of organic and inorganic materials, assembling them into ordered structures having functional capabilities remains the major bottle-neck. Within this context, inhomogeneous particles have attracted tremendous amount of attention, recently. They can be defined as particles with well defined sites, patches or inhomogeneities consisting of a separate chemical entity at prescribed locations. Such particles have been demonstrated to serve as much more efficient building blocks to create premeditated, higher-order complex architectures owing to their built-in recognition sites to direct the self-organization of particles (Zhang et al., 2005, Glotzer, 2004, Zhang and Glotzer, 2004). Structures thus formed can take the shapes of sheets, diamonds, rings, pyramids, and chains, and have potential applications in self-assembling electronic circuits, photonic crystals, solar panels, biological applications and clinical diagnosis utilizing selective molecular recognition, scaffolds for assembling other compounds, as colloidal liquid crystals in display devices, electro-rheological fluids, and switching devices (Cayre et al., 2003, Lu et al., 2003, Nakahama et al., 2000, Takei and Shimizu, 1997).

Colloidal particles (100 nm to 10 micron in diameter) usually have their surface uniformly covered with charged species or any other molecular species which is either ionically bound or covalently attached. Synthesis of particles with geometrically well-defined and precisely located inhomogeneities is a challenging task for surface and colloid scientists. There are only a few techniques to fabricate inhomogeneous particles: Langmuir-Blodgett technique, microcontact printing, evaporation (physical vapor deposition) of metals on colloid monolayer followed by chemisorption, using either gas-liquid, liquid-solid, or gas-solid interface to create particles with hemispheres of two different functionalities, and simultaneous electrohydrodynamic jetting.

In the Langmuir-Blodgett technique, a plate covered with a monolayer of colloids is initially dipped in a solvent. The solvent also hosts a floating monolayer of the coating polymer. The plate is slowly pulled upwards perpendicular to the monolayer of the coating polymer. The monolayer of coating polymer gets transferred onto a restrictive part of the monolayer of colloidal particles. Thus, the individual colloidal particles end up having inhomogeneities of the polymer. Nakahama et al. demonstrated this by coating a monolayer of amphiphilic terpolymer of octadecyl acrylamide, p-nitrophenyl acrylate, and 2,2,2-trifluoroethyl methacrylate on particles approximately 182 nm in diameter initially deposited on a glass plate (Nakahama et al., 2000).

In the microcontact printing technique, films of specific chemicals deposited on PDMS stamps are printed onto monolayer of colloid particles deposited on a solid substrate. In one particular example, Cayre et al. prepared a monolayer of latex spheres on a glass substrate. Then, a monolayer film of water-insoluble surfactant with charge opposite to that of latex particles was deposited on a PDMS stamp. Lastly, the surfactant film is printed onto the colloid monolayer and then the colloids are redispersed in water (Cayre et al., 2003). In this way, the colloidal particles end up having a bipolar surface charge distribution.

In the vapor deposition technique, the monodisperse colloidal particles are either spin coated (Choi et al., 2003) or drop-casted (Love et al., 2002) on a solid substrate to form a monolayer. Subsequent physical vapor deposition of metals (e.g., gold, platinum, and palladium) coats only the top hemisphere of the particles (Petit et al., 2001, Takei and Shimizu, 1997).

Interface between two media has also been used to introduce functional dissymmetry in uniform colloidal particles (Petit et al., 2000, Fujimoto et al., 1999). In a typically process, the colloidal particles are first assembled on the media interface (air-liquid or liquid-solid) to form a monolayer. The two hemispheres are exposed to the two different mediums owing to which the two sides will react differently. Functional groups to be impinged on either of the hemispheres of the colloid, is introduced through one of the two mediums.

In the technique of simultaneous electrohydrodynamic jetting, two distinct polymer solutions were pumped through a modified nozzle with a side-by-side geometry. The ejecting liquids form a Taylor cone which was fragmented to give particles with two distinct hemispheres (also called as biphasic colloids) (Roh et al., 2005).

Above mentioned particles with dual surface functionalities have also been called "Janus" particles (named after the two-faced Roman god Janus) and anisotropic particles.

All these preparation routes to inhomogeneous particles tend to be labor-intensive processes, requiring multiple steps to be performed in a sequential manner. The present invention combines all the processing benefits of nanoparticle assembly of particles with the unusual phase-separating behavior of polymers that have the same charge but different molecular structures.

SUMMARY OF THE INVENTION

The present invention provides a simple and convenient method based on a self-assembly process that leads to the formation of inhomogeneous particles. In preferred embodiments, the present invention relates to inhomogeneous particles or capsule structures having inhomogeneous or patchy surfaces. In some embodiments, the nanoparticles of the invention may have a partial or complete shell comprising a first polymer and a partial shell or core partially or complete comprised of a second polymer. Also, withholding the nanoparticles yields polymer aggregates with inhomogeneous surfaces. These polymer aggregates may also be considered inhomogeneous particles.

In preferred embodiments, the present methods for making inhomogeneous particles comprises providing an amount of each of at least two polyelectrolytes. The method further comprises providing an amount of counterion having a valence of at least 2. Additionally, the method comprises combining the polyelectrolyte and the counterion in a solution such that polyelectrolyte self-assembles to form inhomogeneous aggregates. Moreover, the method comprises adding nanoparticles to the solution such that nanoparticles arrange themselves around the inhomogeneous aggregates to form inhomogeneous particles.

The method may be carried out at ambient temperature and may further include the step of removing the polyelectrolyte so as to produce hollow structures. In certain embodiments, the counterion may have a valence of at least 3.

In some embodiments, the final step produces sub-micron/micron-sized organic-inorganic spheres in which the shell consists of nanoparticles and polyelectrolyte molecules that hold the nanoparticles together. The method may further include functionalizing the polyelectrolyte with at least one moiety selected from the group consisting of: organic molecules, organic fluorophores, and biomolecules and the functionalization may occur before the formation of the encapsulating nanoparticle shell. Alternatively or in addition, the nanoparticles may be functionalized.

In certain embodiments, the polyelectrolyte comprises a polyamine. In other embodiments, the polyelectrolyte is any polymer that has a positive charge in solution.

The counterion may preferably be added as a salt, which may comprise a compound selected from group consisting of but not limited to carboxylates, sulphates and carbonates such as sodium sulphate, trisodium citrates, tri sodium salts of EDTA, tetra sodium salts of EDTA, and combinations thereof. In a further embodiment, the counterion may comprise at least two salts. Alternatively, the counterion may be a crown-ether consisting of charged moieties such as carboxylates, phosphates, sulfates or carbonates.

In certain embodiments, the nanoparticles comprise silica nanoparticles. In certain other embodiments, the nanoparticles are colloidal species and can comprise metals, metal oxides having a positively charged surface, metal-nonoxides, organic particles, linear polymer, biomolecules, fullerenols, single/multi-walled carbon nanotubes, or combinations thereof.

In certain other embodiments, the polyelectrolyte is negatively charged, the counterion is positively charged and the nanoparticles have negative surface charge.

The invention also includes a method of forming an inhomogeneous particle by providing a positively charged polymer (polyelectrolyte) in solution with a counterion and contacting the solution with silica nanoparticles and compositions comprising aggregates of positively charged polyelectrolyte, counterions, and silica nanoparticles.

In still other embodiments, the counterion is selected from the group consisting of polymers, dendrimers, molecular ions, and metal ions. In specific embodiments, the polymer comprises DNA and/or the nanoparticles comprise ceramic particles.

The present invention further includes an inhomogeneous particle comprising at least two charged polymers, a counterion, and inorganic nanoparticles. In another embodiment, the inhomogeneous particle comprises at least two charged polymers and a counterion.

Notably, the synthesis performed according to the present fabrication methods can be performed at neutral pH and ambient conditions i.e. ambient temperature and pressure. A variety of inorganic and organic nanoparticles such as metals, metal-oxides, metal-non-oxides, non-metal oxides, and polymer beads can be used, depending upon their ability to have electrostatic interactions with the charged polyelectrolytes. The inhomogeneous particles thus formed often have spherical morphologies with a shell wall composed of the inorganic/organic nanoparticles and the polyelectrolyte. It is expected that the hollow core of these materials can be utilized to encapsulate useful and interesting materials for special applications such as drug delivery, packaging, catalysis, and sensors. Importantly, the mild synthesis conditions allow the encapsulation of sensitive organic compounds without degrading them. In addition, the synthesis process can be modified to be both economically and environmentally favorable.

The combination of nanoparticle (NP) suspensions and oppositely charged polymer solutions generally leads to the flocculation of randomly-structured aggregates. The present methods provide a direct and efficient synthesis route in which charged polymers interact with multivalent counterions leading to the self-assembly of these polymers, which in turn templates the assembling of inorganic/organic nanoparticles to form hollow structures. The present methods allow the preparation of hollow or non-hollow inhomogeneous particles without the use of expensive Au nanoparticles or quantum dots (required by related methods to hollow microspheres [M. S. Wong, J. N. Cha, K.-S. Choi, T. J. Deming, and G. D. Stucky, "Assembly of Nanoparticles into Hollow Spheres Using Block Copolypeptides," Nano Lett. 2, 583-587 (2002); J. N. Cha, H. Birkedal, M. H. Bartl, M. S. Wong, and G. D. Stucky, "Spontaneous Formation of Nanoparticle Vesicles from Homopolymer Polyelectrolytes," J. Am. Chem. Soc. 125, 8285-8289 (2003); J. N. Cha, M. H. Bartl, M. S. Wong, A. Popitsch, T. J. Deming, and G. D. Stucky, "Microcavity Lasing from Block Peptide Hierarchically Assembled Quantum Dot Spherical Resonators," Nano Lett. 3, 907-911 (2003); V. S. Murthy, J. N. Cha, G. D. Stucky, and M. S. Wong, "Charge-driven Flocculation of Poly-L-lysine—Gold Nanoparticle Assemblies Leading to Microshell Formation," J. Am. Chem. Soc. 126, 5292-5299 (2004); United States Patent Application 20030082237). According to the present methods, the aggregation of polyamines or other polyelectrolytes is effectively controlled by adding various types of multidentate counterions at appropriate concentrations and pH's (Table 2). These then template and spontaneously yield hollow structures via the self-assembly of nanoparticles under a wide pH range and at ambient reaction conditions. These structures with patches or inhomogeneities may serve as the basis for a new type of targeted drug delivery system and as building blocks for fabricating new nanomaterials.

In preparing materials for drug delivery and other applications, it is often necessary to coat the material with surface molecules. The roles of these surface molecules include making the surface hydrophilic or hydrophobic; passivating the surface to minimize uncontrolled aggregation and adsorption; and functionalizing with reactive molecules for selective binding. The problem is the lack of control of how these molecules are distributed on the surface. The molecules either completely cover for randomly distribute across the surface. The inhomogeneities overcome this problem, and provide for spatially controlled surface coating.

Particles prepared according to the present invention may have potential applications in diverse areas such as drug delivery, chemical storage, contaminated waste removal, gene therapy, catalysis, cosmetics, magnetic contrast agents (for use in magnetic resonance imaging), and magneto-opto-electronics. Particles made from porous nanoparticles as the building blocks can find use as low-dielectric materials, insulation, catalysts, separation membranes, and photonic band-gap materials. It should be emphasized that for many of the above applications the present synthesis procedure provides flexibility to meet the required reaction conditions such as pH of the medium, temperature, etc. depending upon specific applications The foregoing has outlined broadly the features and technical advantages of the present invention in order that the detailed description of the invention will be described hereinafter that form the subject matter of the claims of the invention. It should be appreciated by those skilled in the art that the conception and the specific embodiments disclosed may be ready utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiment of the present invention, reference will now be made to the accompanying drawings, wherein:

FIG. 1 is a reaction schematic for the synthesis of inhomogeneous particles;

FIG. 2 shows microphase separated (poly-L-lysine(PLL)+ poly(allylamine)hydrochloride (PAH)) aggregate morphology as a function of relative polymer concentrations;

FIG. 3 shows inhomogeneous particles from microphase separated mixtures of (PLL+PAH), trisodium citrate, and silica nanoparticles; and FIG. 4 shows inhomogeneous particles obtained after addition of a covalent crosslinker (glutaraldehyde) to the (PLL+ PAH) aggregates.

DETAILED DESCRIPTION OF THE PREFERRED EMBODIMENTS

In an embodiment, inhomogeneous particles may be prepared by: a) providing an amount of each of at least two polyelectrolytes; b) providing an amount of a counterion having a valence of at least 2; c) combining the polyelectrolytes and the counterion in a solution such that the polyelectrolytes self-assemble to form inhomogeneous aggregates; d) adding nanoparticles to the solution such that the nanoparticles arrange themselves around the inhomogeneous aggregates to form inhomogeneous particles. In another embodiment, the inhomogeneous particles comprise at least two charged polymers, and a counterion. In another embodiment, the inhomogeneous particle further comprises inorganic nanoparticles.

The positively charged polyelectrolytes may comprise suitable compounds selected from the group consisting of polypeptides, polyamides, and polyamines with different chain lengths with straight or branched structures (e.g., polylysine, polyallylamine, polyethyleneimine). Without limitation, suitable chain lengths may be in the range of about 1,000 Da to about 300,000 Da. In some embodiments, the counterion may preferably be negatively charged and comprise a compound selected from the group consisting of carboxylates, phosphates, sulfates, carbonates, aminocarboxylates, peptides, polypeptides, copolypeptides and polymers having negative charge (e.g. polyaspartic acid and polyglutamic acid).

Alternatively, with negatively charged polyelectrolytes, the counterion may preferably be positively charged and comprise cationic counterions such as polyamines. In these embodiments the negatively charged polyelectrolytes can comprise compounds selected from the group consisting of peptides, polypeptides, copolypeptides, amines, polyamines, and polymers having positive charge including lysine and histidine, or derivatives thereof. Suitable copolypeptides may be derived from the 20 natural amino acids (lysine, arginine, histidine, aspartic acid, glutamic acid, glycine, alanine, valine, leucine, isoleucine, methionine, proline, phenylalanine, tryptophan, serine, threonine, asparagine, glutamine, tyrosine, and cysteine). Combinations of polypeptides and polymers may also be used.

The polyelectrolytes and the counterions may preferably be selected and provided such that the overall charge ratio R of total charge attributable to the dissolved salt to total charge attributable to the polymer is greater than 1.0, more preferably greater than 2, still more preferably greater than 3, and optionally about 10. When the polyelectrolytes are positively charged, R may be expressed as $R=[anion]\times|z^-|/[polymer]\times|z^+|$, where [anion] and [polymer] represent total concentrations, $z^-$ is negative charge per anion, and $z^+$ is positive charge per polymer chain. In embodiments in which the charges are reversed, the polyelectrolytes may be negatively charged and the counterions may be cations and $R=[cation]\times|z^+|/[polymer]\times|z^-|$.

The polyelectrolytes may preferably be dissolved in water, or in any other solvent that is capable of dissolving both the polyelectrolyte and the counterion precursor. The synthesis may be carried out over a broad range of temperatures, limited primarily by the solvent. Thus, in some embodiments the preferred temperature range may be between 0° C. and 100° C. and more preferably 20° C. to 85° C. The polyelectrolytes and counterion may be combined in solution so that the polyelectrolytes form inhomogeneous aggregates. Without being limited by theory, it is believed that the polyelectrolytes self assemble to form the aggregates.

In particular embodiments, the polyelectrolytes may be functionalized with any suitable moiety. Examples of suitable moieties include without limitation, organic molecules, biomolecules, organic fluorophores, peptides, receptors, ligands, antibodies, or combinations thereof.

In embodiments where the polyelectrolytes are cationic, the pH of the synthesis solution may preferably be less than or equal to the pKa of the polyelectrolyte. In embodiments where the polyelectrolytes are anionic, the pH of the synthesis solution may preferably be greater or equal to the pKa of the polyelectrolyte. Without being limited by theory, the pH of the solution may have an effect on the rate of aggregation and on the structure of the resulting particles.

Nanoparticles may be added to the solution to form inhomogeneous particles. The nanoparticles may be silica or may comprise any suitable colloidal metals. Examples of suitable colloidal metals include without limitation, gold, platinum, palladium, copper, silver, rhodium, rhenium, nickel, and iridium having surface positive/negative charge, alloys of metals, such as platinum/iridium having surface positive/negative charge, metal non-oxides, such as Group II-VI, III-V, and IV quantum dots having surface positive/negative charge, or metal oxides, such as titanium oxide, zirconium oxide, aluminum oxide, iron oxide, tungsten oxide, cerium oxide, antimony oxide and silicon oxide having surface positive/negative charge. Alternatively, the nanoparticles may comprise at least one material selected from the group consisting of metals, metal oxides, metal-nonoxides, organic particles, linear polymer, biomolecules, fullerenols and single/multi-walled carbon nanotubes. In other embodiments, the nanoparticles may comprise molecular clusters, such as Keggin ions and heteropolymetallates, or may be organic and composed of crosslinked polymers. Example of crosslinked polymers include without limitation, polystyrene, polypyrrole, or combinations thereof. The nanoparticles may comprise an average diameter in the range of about 1 nm to about 100 nm.

In further embodiments, the nanoparticles may be functionalized with any suitable moiety. Examples of suitable moieties include without limitation, organic molecules, biomolecules, organic fluorophores, peptides, receptors, ligands, antibodies, or combinations thereof.

In still other embodiments, silica nanoparticles may be replaced with same-charged polymers to form inhomogeneous structures via electrostatic interactions. Examples of same-charged polymers that may be used include without limitation, polyacrylate, polystyrene sulfonate, or combinations thereof.

The nanoparticles may also be provided in the form of any suitable uncharged polymer to form inhomogeneous structures. An example of a suitable uncharged polymer includes without limitation, dextran. Without being limited by theory, hydrogen-bonding and/or hydrophobic interactions rather than electrostatic interactions drives the adsorption of uncharged polymer into the polylysine-salt aggregates in these embodiments.

According to other embodiments of the invention, two, three, or more polymers may be used to achieve inhomogeneous particles. The particles produced in this manner undergo multipolymer segregation during aggregation to form the inhomogeneities. The inhomogeneous particles may have polymer segregation between shell and core, on the surface of the shell, or between regions or "domains" within the shell and/or core resulting in inhomogeneities. Likewise, combinations of two or more salts may be used to achieve the necessary polymer segregation for inhomogeneity.

FIG. 1 shows the proposed formation mechanism of the inhomogeneous particles. The polymer aggregates may display inhomogeneities prior to nanoparticle introduction. Thus, these polymer aggregates, with or without covalent crosslinking, may also comprise inhomogeneous particles that may be manipulated similar to the inhomogeneous particles fabricated with nanoparticles. The formed inhomogeneous particles may comprise inhomogeneities, a shell, and a core. Additionally, the inhomogeneous particle may comprise a size in the range of about 100 nm to about 500 nm, alternatively in the range of about 500 nm to about 5,000 nm, alternatively in the range of about 5,000 nm to about 50,000 nm. The inhomogeneous particles may comprise inhomogeneities having an average size in the range of about 10 nm to about 1,000 nm, preferably in the range of about 100 nm to about 500 nm.

The selection of polymers, counterions and nanoparticles may be varied as set out in co-pending and co-owned patent application Ser. No. 10/969,391, entitled "Method to Fabricate Microcapsules from Polymers and Charged Nanoparticles," which is incorporated herein by reference. The size and number of the domains or inhomogeneities may be controlled without limitation, by varying the mole ratio of the two or more polymers, by the selection of different polymer, counterions, and nanoparticles, and/or by controlling the growth time. The polymers may be spatioselectively designed and functionalized so that nanoparticles having a desired configuration of inhomogeneities and/or surface features may be produced.

The resulting inhomogeneous particles may be conjugated to different functional groups, such as fluorescent dye molecules (as shown in Figures). Other variations are listed in co-pending and co-owned patent application Ser. No. 10/969,391, mentioned above.

The preparation of inhomogeneous particles may further include post-treatment of the particle surface with organic molecules, additional nanoparticles, and an inorganic coating. The inhomogeneities of the particles may further be functionalized with any suitable functional moiety. Examples of suitable functional moieties include without limitation, peptides, proteins, receptors, antibodies, ligands, or combinations thereof. In further embodiments, assemblies of inhomogeneous particles may be formed through the linkage of the functionalized inhomogeneities.

The inhomogeneous particles assembled from nanoparticles may also be used as building blocks for further assembly so as to make hierarchical hollow structures. The hollow structures may be formed by removing the inhomogeneous aggregate of polyelectrolytes from the nanoparticle shell. The hierarchical structure may comprise particles made from same or different polymers, counterions and nanoparticles. Thus, the inhomogeneous particles may be water-filled, gas-filled or polymer-filled.

The present synthesis methods may be carried out in a flow-type reactor, such as microfluidic device or in an aerosol reactor, or in any other type of reactor that allows the components to come into mixing contact with each other. The preparation of the inhomogeneous particles may satisfy many of the requirements for a chemical process to be "green" and environmentally friendly, enabling the scale-up of the preparation method. It may be carried out at room temperature, at atmospheric pressure, in water, and at mild pH values by mixing the 3 components sequentially together. The inhomogeneous particle size, size distribution, and shape may be tailored by controlling how the components are mixed at the nanoscale.

To further illustrate various illustrative embodiments of the present invention, the following examples are provided.

EXAMPLE I

Microphase Aggregation of Poly-L-lysine and Poly(allylamine) Induced by Multivalent Salts An aqueous solutions of poly-L-lysine (MW=68.6 kg/mol, HBr salt form, covalently tagged to green fluorescein isothiocyanate dye, PLL) was prepared with a concentration of 4.5 mg/ml. An aqueous solution or poly(allylamine) (MW=70 kg/mol, HCl salt form, covalently tagged to red rhodamine isothiocyanate) was prepared with a concentration of 2 mg/ml. The two solutions were mixed together in a 1.5 ml centrifuge tube in different volume ratios (10:90, 25:75, 50:50, 75:25, 90:10) to give a total volume of 50 μl. To this homogenous mixture, 125 μl of trisodium citrate (28.5 mM) was added and then vortex mixed for 10 sec (solution A). The suspension was aged for 20 min without any mixing. The negative/positive charge ratio R in the solution was kept constant at 10. A drop of the suspension was deposited on a glass slide and sealed under the coverslip for microscopy imaging. The resulting aggregates for various combinations of the polymer concentrations is shown in FIG. 1. Microscopy was carried out on a Zeiss LSM 510 confocal microscope equipped with 100× oil immersion objective (NA=1.4).

EXAMPLE II

Inhomogeneous Particle Formation with Poly-L-lysine, Poly(allylamine), Trisodium Citrate, and Silica Nanoparticles An aqueous solutions of poly-L-lysine (MW=68.6 kg/mol, HBr salt form, covalently tagged to green fluorescein isothiocyanate dye, PLL) was prepared with a concentration of 4.5 mg/ml. An aqueous solution or poly(allylamine) (MW=70 kg/mol, HCl salt form, covalently tagged to rhodamine isothiocyanate) was prepared with a concentration of 2 mg/ml. The two solution were mixed together in a 1.5 ml centrifuge tube in different volume ratios (100:0, 90:10, 75:25, 50:50, 25:75, 10:90, 0:100) to give a total volume of 50 µl. To this homogenous mixture, 125 µl of trisodium citrate (28.5 mM) was added and then vortex mixed for 10 sec (solution A). The suspension was aged for 20 min. The positive/negative charge ratio R in the solution was kept constant at 10. To form the inhomogeneous particles, 125 µl of a sol containing silica nanoparticles (Snowtex O, Nissan Chemicals, 20.4 wt. % solids, pH 3.4, 13 ±3 nm diameter as measured through DLS) was added to the suspension and vortex mixed for 20 sec (solution B). The solution A was occasionally aged for various times to see the changes in aggregate size and its effect on the final size of the inhomogeneous particles by subsequently adding the silica sol to the aged solution A. After centrifugation of the solution B for 30 sec a clear precipitate was seen. When viewed in optical microscope images, this precipitate was seen to be composed of shell structures made from PLL (green in color) and inhomogeneities composed of PAH (red in color) as shown in FIG. 2. Microscopy was carried out on Zeiss LSM 510 confocal microscope equipped with 100× oil immersion objective (NA=1.4).

EXAMPLE III

Inhomogeneous Particle Formation with Poly-L-lysine, Poly(allylamine), Trisodium Citrate, and Glutaraldehyde An aqueous solutions of poly-L-lysine (MW=68.6 kg/mol, HBr salt form, covalently tagged to green fluorescein isothiocyanate dye, PLL) was prepared with a concentration of 4.5 mg/ml. An aqueous solution or poly(allylamine) (MW=70 kg/mol, HCl salt form, covalently tagged to rhodamine isothiocyanate) was prepared with a concentration of 2 mg/ml. The two solution were mixed together in a 1.5 ml centrifuge tube in different volume ratios (100:0, 90:10, 75:25, 50:50, 25:75, 10:90, 0:100) to give a total volume of 50 µl. To this homogenous mixture, 125 µl of trisodium citrate (28.5 mM) was added and then vortex mixed for 10 sec (solution A). The suspension was aged for 20 min. The positive/negative charge ratio R in the solution was kept constant at 10. To form the inhomogeneous particles, 50 µl of glutaraldehyde solution (25%) was added to the suspension, vortex mixed for 20 sec (solution B) and aged for 12 hrs. After centrifugation of the solution B for 30 sec a clear precipitate was seen. The precipitate was washed with water twice, deposited on an aluminum stub, sputter coated with gold, and observed under scanning electron microscope (JEOL 6500) as shown in FIG. 3.

Although the present invention and its advantages have been described in detail, it should be understood that various changes, substitutions and alterations may be made herein without departing from the spirit and scope of the invention as defined by the appended claims

We claim:
1. A method for making inhomogeneous particles, comprising:
   a) providing an amount of each of at least two polyelectrolytes;
   b) providing an amount of a counterion having a valence of at least 2, wherein the counterion is selected from the group consisting of polymers, dendrimers, molecular ions, and metal ions;
   c) combining the polyelectrolytes and the counterion in a solution such that the polyelectrolytes self assemble to form inhomogeneous aggregates; and
   d) adding nanoparticles to the solution such that nanoparticles arrange themselves around the inhomogeneous aggregates to form inhomogeneous particles.

2. The method according to claim 1 wherein the inhomogeneous particles comprise inhomogeneities, an aggregate core and a shell.

3. The method according to claim 1 wherein the counterion has a valence of at least 3.

4. The method according to claim 1 wherein the charge ratio R of total charge of the counterions to the total charge of the polyelectrolytes is greater than 1.0.

5. The method according to claim 1 wherein steps a)-c) are carried out such that the pH of the synthesis solution is ≦pKa of the polyelectrolytes.

6. The method according to claim 1, further comprising the step of removing the polyelectrolytes so as to produce inorganic hollow structures.

7. The method of claim 2 wherein step d) is carried out so as to produce sub-micron or micron-sized organic-inorganic spheres in which the shell consists of nanoparticles and polyelectrolyte molecules that hold the nanoparticles together.

8. The method according to claim 1 wherein at least one polyelectrolyte is functionalized with at least one moiety selected from the group consisting of: organic molecules, organic fluorophores, and biomolecules.

9. The method according to claim 1. wherein the nanoparticles are functionalized.

10. The method according to claim 1 wherein at least one polyelectrolyte comprises a polyamine.

11. The method according to claim 1 wherein at least one polyelectrolyte comprises a positive charge in solution.

12. The method according o claim 1 wherein the counterion comprises at least one salt selected from the group consisting of carboxylates, sulphates and carbonates and including sodium sulphate, trisodium citrates, tri sodium salts of EDTA, tetra sodium salts of EDTA, and combinations thereof.

13. The method according to claim 1 wherein the counterion comprises at least two salts.

14. The method according to claim 1 wherein the nanoparticles comprise metals, metal oxides, metal-nonoxides, organic particles, linear polymer, biomolecules, fullerenols, single/multi-walled carbon nanotubes, or combinations thereof.

15. The method according to claim 1 wherein the nanoparticles comprise silica nanoparticles.

16. The method according to claim 1 wherein the nanoparticles comprise an average diameter between about 1 nm to about 100 nm.

17. The method according to claim 1 wherein at least one of steps c) and d) is carried out at ambient temperature.

18. The method according to claim 1 wherein at least one polyelectrolyte has a negative charge in solution.

19. The method according to claim 1 wherein at least one polyelectrolyte comprises a compound selected from the group consisting of polypeptides and polyamines with different chain lengths with straight or branched structures.

20. The method according to claim 19 wherein the compound comprises a chain length in the range of about 1,000 Da to about 300,000 Da.

21. The method according to claim 1 wherein the counterion is negatively charged and comprises a compound selected from the group consisting of carboxylates, phosphates, sulfates, peptides, polypeptides, copolypeptides, and polymers having negative charge including aspartic acid and glutamic acid.

22. The method according to claim 1 wherein the counterion is positively charged and comprises at least one cationic counterion selected from the group consisting of peptides, polypeptides, copolypeptides, amines, polyamines, and polymers having positive charge including lysine and histidine.

23. The method according to claim 1 wherein the counterion is selected from the group consisting of polymers, dendrimers, molecular ions, and metal ions.

24. The method according to claim 2, further comprising functionalizing the inhomogeneities with functional moieties.

25. The method according to claim 24 wherein the moieties comprise peptides, proteins, receptors, antibodies, ligands, or combinations thereof.

26. A method of making inhomogeneous particles by providing at least two positively charged polymers in solution with a counterion selected from the group consisting of polymers, dendrimers, molecular ions, and metal ions and contacting the solution with silica nanoparticles.

27. The method according to claim 1 wherein the particles comprise inhomogeneities having average sizes in the range of about 100 nm to about 500 nm.

28. The method of claim 2 wherein the inhomogeneities are on the surface of the particles, within the shell, or on the aggregate core.

29. The method according to claim 1 wherein the particles comprise a shell composition and a core composition that are different.

30. The method according to claim 2 wherein the shell is inhomogeneous.

31. The method according to claim 1 wherein the particles are water-filled, polymer-filled, or gas-filled.

32. The method according to claim 1 wherein the nanoparticles comprise at least one material selected from the group consisting of metals, metal oxides, metal-nonoxides, organic particles, linear polymer, biomolecules, fullerenols and single/multi-walled carbon nanotubes.

* * * * *